United States Patent
Rangaraj

(10) Patent No.: US 11,036,864 B2
(45) Date of Patent: Jun. 15, 2021

(54) OPERATING SYSTEM BASED AUTHENTICATION

(71) Applicant: PAYPAL, INC., San Jose, CA (US)

(72) Inventor: Srini Rangaraj, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 228 days.

(21) Appl. No.: 16/141,871

(22) Filed: Sep. 25, 2018

(65) Prior Publication Data

US 2019/0050572 A1 Feb. 14, 2019

Related U.S. Application Data

(63) Continuation of application No. 15/079,112, filed on Mar. 24, 2016, now Pat. No. 10,083,282.

(51) Int. Cl.
  *G06F 21/00* (2013.01)
  *G06F 21/57* (2013.01)
  *H04L 29/06* (2006.01)
  *H04L 29/08* (2006.01)
  *G06F 21/44* (2013.01)
  *G06F 21/73* (2013.01)

(52) U.S. Cl.
  CPC ............ *G06F 21/575* (2013.01); *G06F 21/44* (2013.01); *G06F 21/73* (2013.01); *H04L 63/0428* (2013.01); *H04L 63/0876* (2013.01); *H04L 67/02* (2013.01)

(58) Field of Classification Search
  CPC ........ G06F 21/575; G06F 21/44; G06F 21/73; H04L 63/0876; H04L 63/0428; H04L 67/02
  See application file for complete search history.

(56) References Cited

U.S. PATENT DOCUMENTS

| | | | |
|---|---|---|---|
| 2009/0106551 A1 | 4/2009 | Boren et al. | |
| 2014/0181892 A1* | 6/2014 | Von Bokern | H04L 63/102 726/1 |
| 2014/0208111 A1 | 7/2014 | Brandwine | |
| 2015/0295930 A1* | 10/2015 | Dixon | H04L 63/0876 713/181 |
| 2015/0326574 A1* | 11/2015 | Amaladoss | H04L 63/0876 726/7 |
| 2016/0294790 A1* | 10/2016 | Susan | H04W 12/04 |
| 2017/0006024 A1* | 1/2017 | Pedersen | G06F 21/34 |

* cited by examiner

*Primary Examiner* — Alexander Lagor

(74) *Attorney, Agent, or Firm* — Haynes and Boone, LLP

(57) ABSTRACT

Methods, systems, and computer program products are included for authenticating computing devices. An exemplary method includes associating a security key with an operating system of a first computing device, wherein the security key is generated from a serial number corresponding to the first computing device. A token corresponding to the security key is sent to a second computing device. The token is accessed by the second computing device to authenticate the first computing device. An authenticated session is established between the first computing device and the second computing device. Within the authenticated session, a connection is provided between the first computing device and the second computing device.

20 Claims, 3 Drawing Sheets

OPERATING SYSTEM BASED AUTHENTICATION

CROSS REFERENCE TO RELATED APPLICATIONS

This application is a continuation of U.S. patent application Ser. No. 15/079,112 filed on Mar. 24, 2016, the content of which is hereby incorporated by reference in its entirety for all purposes.

BACKGROUND

Field of the Invention

The present disclosure generally relates to information security. In particular, the present disclosure relates to methods and systems for authenticating a computing device.

Related Art

Conventional authentication techniques allow users to sign-on to remote computing devices by providing username and password credentials. For example, a user may use a web-browser to enter a password at a website to log onto a remote system to access protected content. Other traditional authentication techniques may also include biometric techniques, such as face recognition, fingerprint recognition, and so forth.

While the above conventional authentication techniques have been generally adequate for restricting access to content, limitations still remain. For example, authenticating a user using these conventional authentication techniques may not be an efficient use of computer resources or user time.

In the case of passwords, users may find it undesirable to enter a password or may forget the password, therefore causing the user to be unable to access particular content. Further, these existing authentication techniques may be insecure. Passwords may be guessed, intercepted, or otherwise improperly obtained by unauthorized users to allow the unauthorized users to gain access to protected content, thereby compromising the security of electronic transactions and data. Similarly, biometric authentication techniques may be similarly undesirable, based on lack of reliability, efficiency and/or cost. Therefore, a need exists to further improve authentication techniques performed by computing devices.

BRIEF DESCRIPTION OF THE DRAWINGS

The present invention is illustrated by way of example and not limitation in the figures of the accompanying drawings.

DETAILED DESCRIPTION

Figure 1:
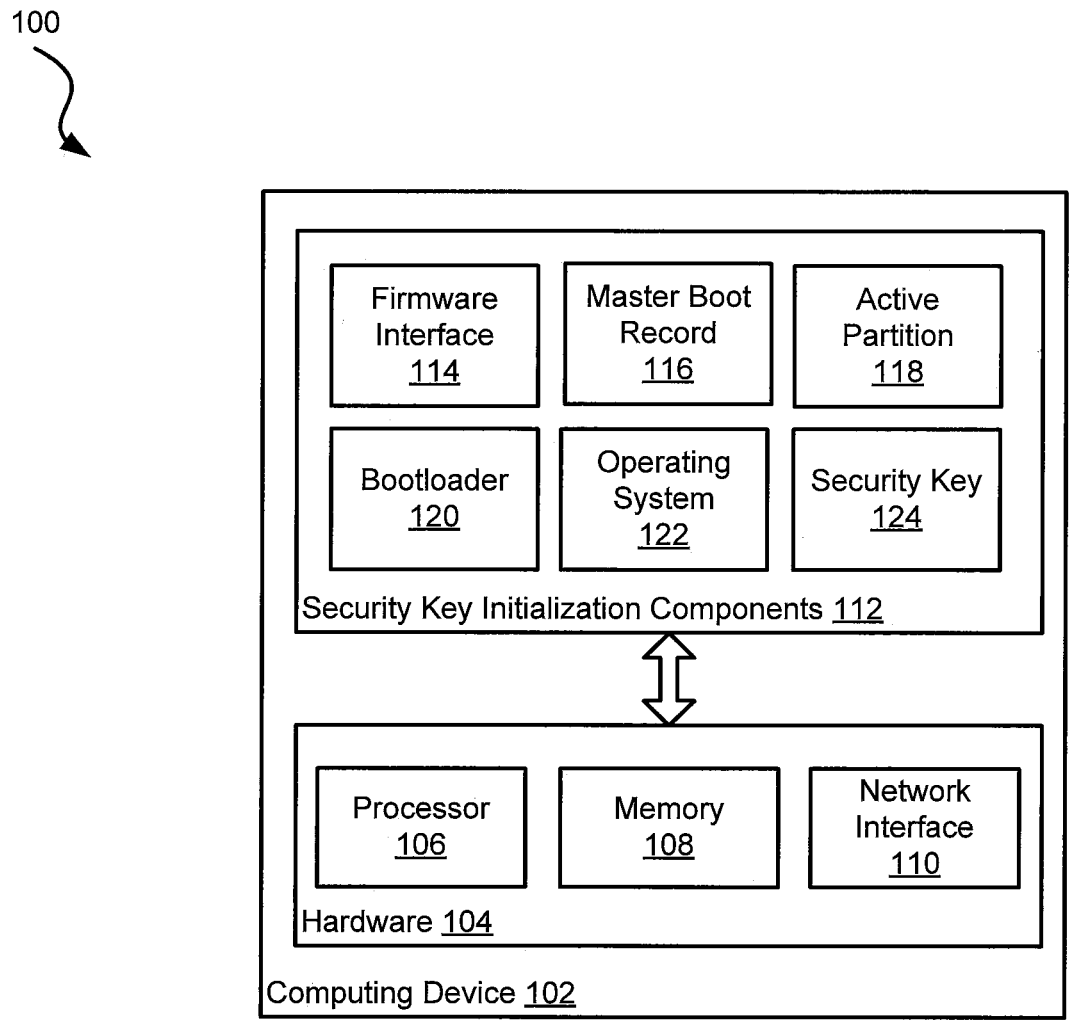
FIG. 1 is a block diagram illustrating an authentication system architecture, in accordance with various examples of the present disclosure.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments provide a system, method, and machine-readable medium for an operating system of a computing device to provide a security key that is used to authenticate the computing device with another computing device. Specifically, the security key may be generated from one or more device identifiers that are unique to the computing device, such as manufacturer provided serial numbers corresponding to the computing device's hardware, network card identifiers, and/or other computing device identifiers that may uniquely identify the computing device. The security key generated from the one or more device identifiers may be utilized by the operating system of the computing device to authenticate the computing device. The computing device may be authenticated by sending the security key or a token derived from the security key to another computing device that performs a matching based on the security key/token. An authenticated session may be created corresponding to the computing device and another computing device, based on the authentication of the computing device. Other connections may be included in the authenticated session in a transparent/seamless manner, such as by detecting the other connections by the operating system of the computing device and associating these other connections with the authenticated session.

The features described above may be beneficial for restricting access to content, while at the same time allowing efficient access of authorized computing devices to the content. Accordingly, the functioning of the computing devices themselves are improved by these techniques, including improvements to security in using the computing devices.

The embodiments disclosed herein provide advantages to current computer-based authentication systems. First, computing devices may be able to access information on remote computers in a transparent manner by using the security key, rather than having to input passwords, biometric data, or other login credentials. Second, because the security key may be generated from unique identifiers of the computing devices and maintained at the operating system level, the security key may provide additional protections from authentication credential theft, thereby providing a more secure computing environment. Of course, it is understood that these features and advantages are shared among the various examples herein and that no one feature or advantage is required for any particular embodiment.

FIG. 1 illustrates an authentication system architecture 100, in accordance with various examples of the present disclosure. System architecture 100 includes a computing device 102. A computing device may include, for example, a rack mount server, desktop computer, laptop computer, tablet, smart phone, or other computing device.

While in the present example a single computing device is illustrated, in other examples there may be additional computing devices. Further, a computing device may comprise a plurality of computing devices. For example, the computing device 102 may include a cluster of computing devices. In the present example, the computing device 102 may be communicatively coupled to other computing devices via a network, which may include any combination of public and/or private networks. The network may include one or more network devices that are communicatively coupled via transport media to communicate signals between the computing device 102 and other computing devices.

The computing device 102 includes hardware 104. Hardware 104 includes physical elements such as a processor 106, a memory 108, and a network interface 110 to communicatively couple the computing device 102 with other computing devices. The network interface 110 may include, for example, a network interface card. Other physical hardware elements may also be included, such as those illustrated in FIG. 2.

The computing device 102 includes security key initialization components 112, which may be implemented by hardware, software, or by a combination of hardware and software. These security key initialization components 112 include a firmware interface 114. The firmware interface 114 may include an interface such as a Unified Extensible Firmware Interface (UEFI) or a Basic Input/Output System (BIOS). The firmware interface 114 is structured as instructions that are executed during a boot sequence of the computing device to initialize the hardware 104.

The Master Boot Record (MBR) 116 is accessed by the firmware interface 114 to execute a bootloader 120. The MBR 116 may be structured at a start of a first storage device included in the memory 108. One or more instructions stored in the MBR 116 may be accessed by the firmware interface 114 to identify an active partition 118, which includes a bootloader 120 that is executed to load and run an operating system 122.

In the present example, the bootloader 120 is structured with a security key 124 that is loaded into one or more memory addresses corresponding to the operating system 122. The security key 124 may be structured as a string or other sequence of numbers, letters, and/or special characters.

The operating system 122 may be structured as WINDOWS, UNIX, LINUX, OS X, ANDROID, IOS, or any other operating system. The operating system 122 is structured to authenticate the computing device 102 with other computing devices by providing a security key 124 or a token generated from the security key 124. Accordingly, the operating system 122 is structured with access to the security key 124, which may be protected from access by applications running on top of the operating system 122. The operating system 122 is structured with functions that may be accessed to trigger the authentication of the computing device 102. In some examples, the functions are accessed according to one or more Application Programming Interfaces (APIs).

In some examples, the security key 124 is generated based on one or more device identifiers of the computing device 102, such as a network interface 110 serial number and/or other device identifiers corresponding to the hardware 104. The security key 124 may be generated prior to or during the boot process. For example, the security key 124 may be pre-loaded onto the computing device 102 by a manufacturer. In other examples, the security key 124 may be dynamically generated from one or more device identifiers during each boot process of the computing device 102.

Generating the security key 124 may include combining multiple device identifiers to form the security key 124. In another example, one or more device identifiers may be input into a cryptography function that outputs the security key 124. The cryptography function may include any proprietary or non-proprietary cryptography function. For example, the cryptography function may be structured to use the Secure Hash Algorithm (SHA), Message-Digest Algorithm (MD5), and/or other cryptography algorithm.

In some examples, the computing device 102 is structured to register the security key 124 with one or more computing devices that are communicatively coupled to the computing device 102 via a network. Further, the computing device 102 may also connect to the one or more computing devices over the network to modify the registration, such as by de-registering the security key 124 and/or replacing a registered security key.

Figure 2:
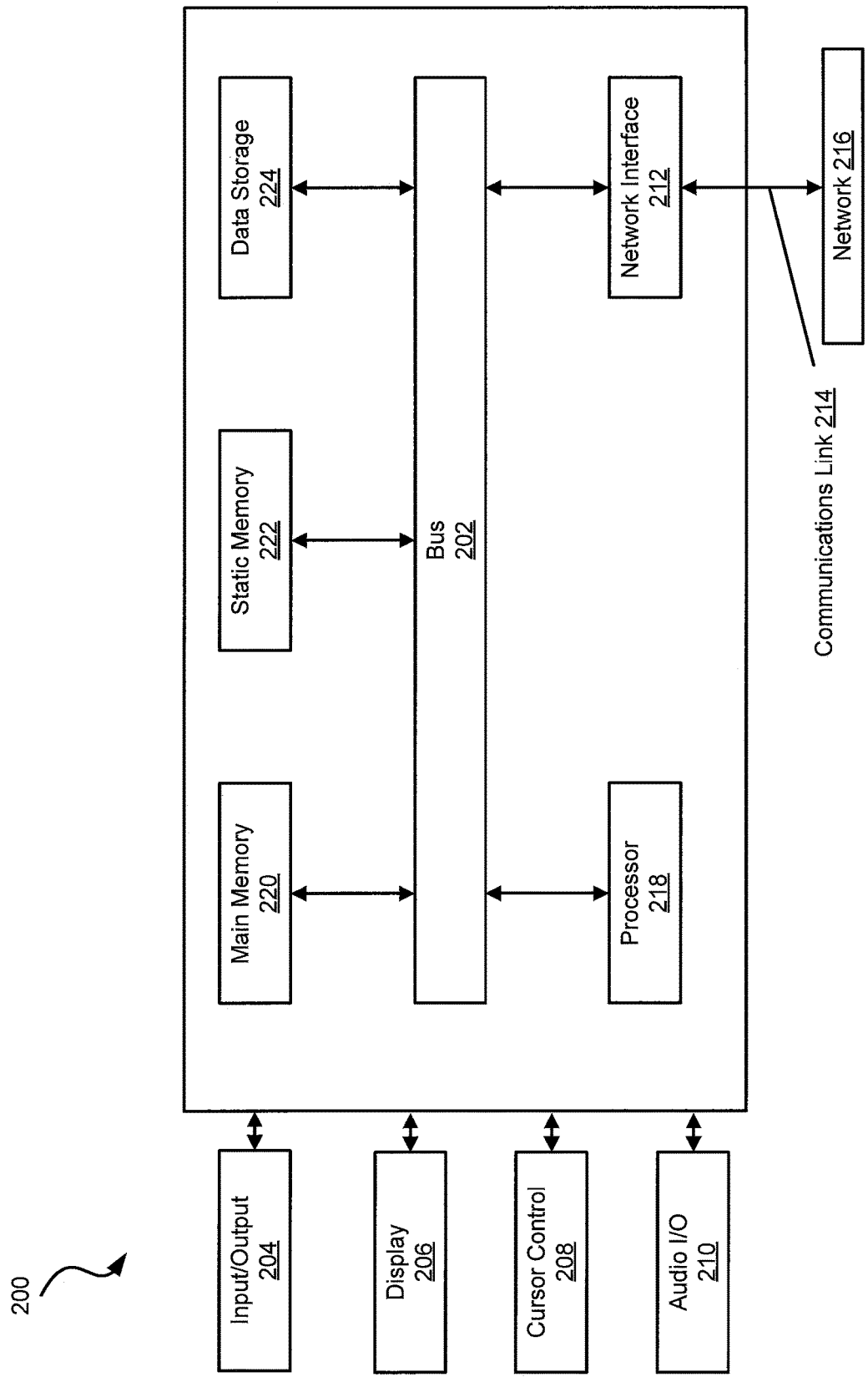
FIG. 2 is a block diagram illustrating a computer system suitable for implementing one or more computing devices.

FIG. 2 illustrates a computer system 200 suitable for implementing one or more computing devices of a computing system (e.g., computing device 102). In various implementations, computer system 200 may provide a computing device, such as a smart or mobile phone, a computing tablet, a desktop computer, laptop, wearable device, rack mount server, or other computing device.

Computer system 200 may include a bus 202 or other communication mechanisms for communicating information data, signals, and information between various components of computer system 200. Components include an I/O component 204 that processes a user action, such as selecting keys from a keypad/keyboard, selecting one or more buttons, links, actuatable elements, etc., and sends a corresponding signal to bus 202. I/O component 204 may also include an output component, such as a display 206 and a cursor control 208 (such as a keyboard, keypad, mouse, touch screen, etc.). An optional audio I/O component 210 may also be included to allow a user to hear audio and/or use voice for inputting information by converting audio signals.

A network interface 212 transmits and receives signals between computer system 200 and other devices, such as user devices, data storage servers, payment provider servers, and/or other computing devices via a communications link 214 and a network 216 (e.g., such as a LAN, WLAN, PTSN, and/or various other wired or wireless networks, including telecommunications, mobile, and cellular phone networks).

The processor 218 represents one or more general-purpose processing devices such as a microprocessor, central processing unit, or the like. More particularly, processor 218 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 108 may also be one or more special-purpose processing devices such as an application specific integrated circuit (ASIC), a field programmable gate array (FPGA), a digital signal processor (DSP), network processor, or the like. Processor 218 is configured to execute instructions for performing the operations and steps discussed herein.

Components of computer system 200 also include a main memory 220 (e.g., read-only memory (ROM), flash memory, dynamic random access memory (DRAM) such as synchronous DRAM (SDRAM), double data rate (DDR SDRAM), or DRAM (RDRAM), and so forth), a static memory 222 (e.g., flash memory, static random access memory (SRAM), and so forth), and a data storage device 224 (e.g., a disk drive).

Computer system 200 performs specific operations by processor 218 and other components by executing one or more sequences of instructions contained in main memory 220. Logic may be encoded in a computer readable medium, which may refer to any medium that participates in providing instructions to processor 218 for execution. Such a medium may take many forms, including but not limited to, non-volatile media, volatile media, and/or transmission media. In various implementations, non-volatile media includes optical or magnetic disks, volatile media includes dynamic memory, such as main memory 220, and transmission media between the components includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 214 to the network 216 may perform instruction sequences to practice the present disclosure in coordination with one another. Modules described herein may be embodied in one or more computer readable media or be in communication with one or more processors to execute or process the steps described herein.

Figure 3:
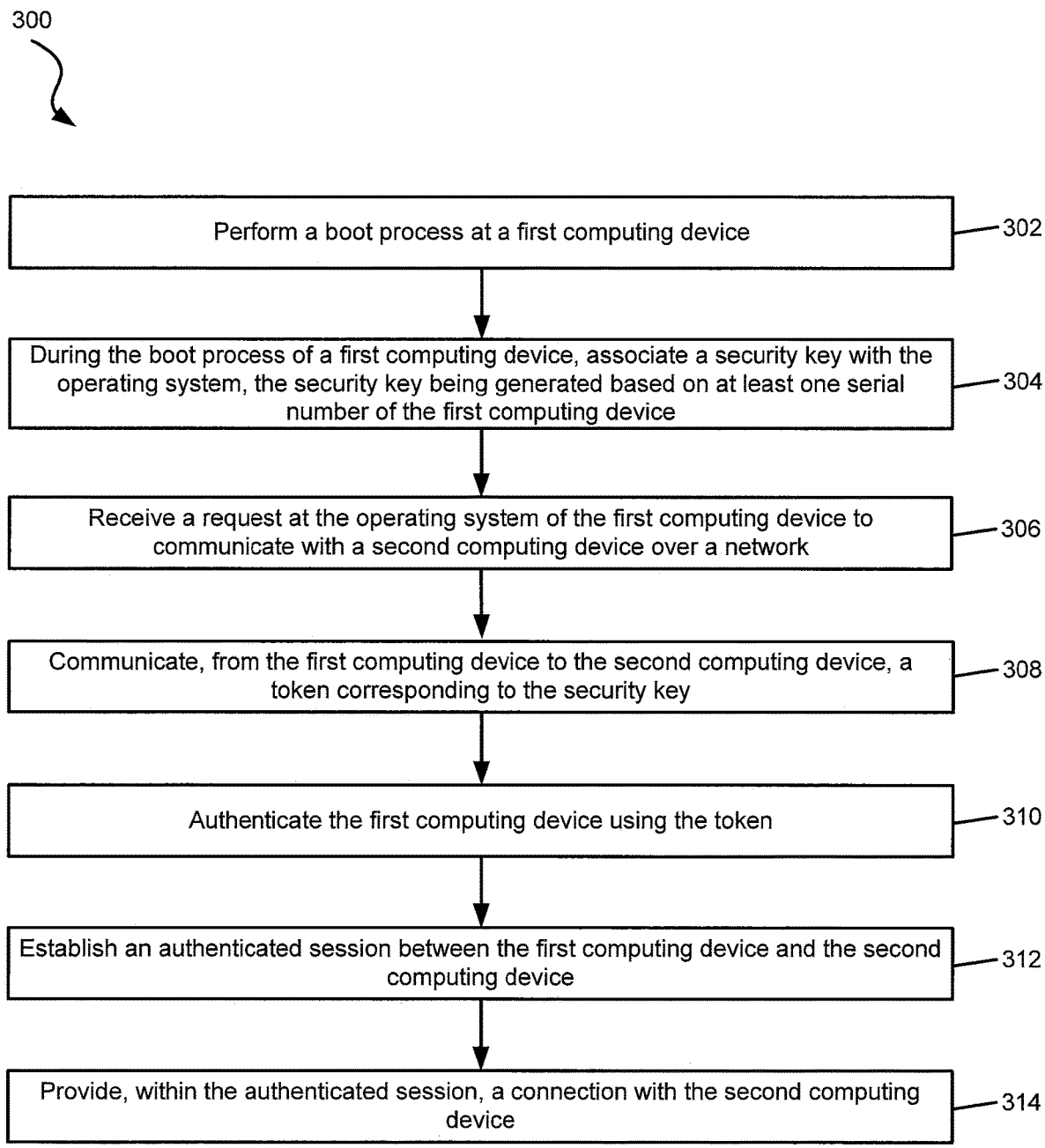
FIG. 3 is a flow diagram illustrating authenticating of a first computing device with a second computing device based on a security key provided by an operating system, in accordance with various examples of the present disclosure.

FIG. 3 illustrates authenticating of a first computing device with a second computing device based on a security key provided by an operating system, in accordance with various examples of the present disclosure. In some examples, the method 300 is implemented by one or more processors of the system architecture 100, by executing computer-readable instructions to perform the functions described herein. It is understood that additional steps can be provided before, during, and after the steps of method 300, and that some of the steps described can be replaced or eliminated in other examples of the method 300. In some examples, the first computing device is a client computing device and the second computing device is a server computing device. In other examples, the first computing device and the second computing devices are peers in a peer-to-peer (P2P) network configuration.

At action 302, a first computing device performs a boot process. In some examples, the boot process includes executing a firmware interface to access one or more instructions stored in a master boot record. The one or more instructions may be accessed to execute a bootloader stored in an active partition. The bootloader may be executed to load and run an operating system.

At action 304, during the boot process, the first computing device associates a security key with the operating system that is loaded and run on the computing device. In some examples, the associating of the security key with the operating system is performed by the bootloader, which stores the security key in one or more memory addresses corresponding to the operating system so that the operating system can access the security key. In some examples, the security key is stored in memory allocated to a kernel that performs low-level tasks such as allocating memory, creating process, and using the processes to execute the instructions provided by the operating system and application running on top of the operating system.

In the present example, the security key is derived from one or more device identifiers that are provided by the first computing device. In some examples, the security key is generated from device identifiers configured on the first computing device by a manufacturer. In other examples, the bootloader or other component may generate the security key on-the-fly during the boot process based on the device identifiers. For example, a network interface card identifier and a manufacturer serial number corresponding to another hardware component may be combined and input into a cryptography algorithm to generate the security key.

At action 306, the operating system is running and is provided access to the loaded security key. A request is received at the operating system to communicate with a second computing device over a network. In some examples, the request is received by an Application Programming Interface (API) of the operating system from a browser or other network application. For example, a user may attempt to connect via the Hypertext Transfer Protocol (HTTP) to a particular website using a browser. To establish the connection, the browser may access an API of the operating system to request that the connection be established. This request may be used to trigger the communication with the second computing device. In other examples, the operating system may itself request that the communication be performed. For example, after performing a boot process or upon establishing a connection to a network, the operating system may itself trigger a request that one or more communications be sent to the second computing device.

At action 308, the first computing device communicates to the second computing device an electronic token corresponding to the security key. In some examples, the token is the security key itself. In other examples, the token is a string or other data value that is generated from the security key. The token may also be the security key in an encrypted form, which may be generated by encrypting the security key using a private key that is stored by the first computing device. For example, the token may be a session identifier that is generated from the security key using a cryptography algorithm. Sending the token rather than the security key itself may provide additional protection for the security key by protecting the security key from the risk of being intercepted. Accordingly, a token may be generated during this action, or prior to action 308, such as during the boot process at action 304 or during the loading of the security key at action 306.

The communication from the first computing device to the second computing device may be sent via a connection that is established or via a connectionless protocol. In some examples, the connection includes a secured communication channel, which may be provided by protocols such as the Secure Sockets Layer (SSL) protocol and/or the Transport Level Security (TLS) protocol. Accordingly, the computing devices may be provided encrypted channels for sending and receiving protected information over a network, to protect the information from being intercepted by unauthorized users. In other examples, the connection may be established using one or more other protocols, such as TCP/IP, HTTP, HTTPS, and so forth. In yet other examples, a connectionless protocol such as UDP may be used to send the token.

At action 310, the second computing device receives the token and uses the token to authenticate the first computing device. The authentication may be performed by the second computing device comparing the token, or a value determined from the token, to a stored identifier to determine that there is a match. For example, the token may be decrypted using a public key corresponding to the first computing device to obtain the security key, which may then be compared with a stored identifier on the second computing device to determine whether there is a match. Accordingly, the second computing device is able to determine whether the first computing device includes the security key. Based on the determining, the second computing device authenticates the first computing device.

Further, in some examples, the second computing device may check a blacklist to determine whether the computing device that sent the token is to be prevented from accessing the second computing device. For example, a security key corresponding to a stolen/hacked computing device or a device that is associated with fraudulent activity may be placed on the blacklist. Accordingly, the second computing device is able to perform additional verification corresponding to the first computing device prior to allowing the first computing device to be authenticated.

At action 312, based on the authentication of the first computing device, an authenticated session is established between the first computing device and the second computing device. A session may include, for example, an interactive information exchange between the computing devices that may have a specified or unspecified duration. The session may be referred to as an "authenticated" session based the second computing device associating the session with the authentication performed at action 310. For example, after authenticating the first computing device, the second computing device may generate a session identifier, or use a session identifier received from the first computing device, and associate the session identifier with communications received from the first computing device. Similarly, the first computing device may associate the session identifier with outgoing communications to the second computing device. Accordingly, the communications between the first computing device and the second computing device may be associated with a common session/information exchange.

The common session may be structured to include particular access privileges that are configured to allow the first computing device to access particular content of the second computing device. Access to content may include, for example, allowing the first computing device to perform particular transactions using the second computing device, such as to read particular data from the second computing device, write to particular storage areas of the second computing device, and so forth.

In some examples, establishing an authenticated session may include associating communications between the first computing device and the second computing device with one or more security tokens that are exchanged between the computing devices and recognized by the computing devices as corresponding to the authentication of the first computing device using the security key.

At action 314, the operating system of the first computing device provides a connection to the second computing device that is included within the authenticated session.

In some examples, a request to establish a connection is received by an API of the operating system from a browser or other network application that is running on the operating system. For example, a user may attempt to connect via the Hypertext Transfer Protocol (HTTP) to a particular website using a browser. To establish the connection, the browser may access an API of the operating system to request that the connection be established. This request may trigger the operating system to provide the connection within the authenticated session.

In some examples, the connection is provided within the authenticated session by the operating system including the security key itself or a token corresponding to the security key, such as a session identifier, with one or more communications that are sent corresponding to the connection. Accordingly, the second computing device may recognize that the connection corresponds to the first computing device that is authenticated, and is able to provide the connection "within the authenticated session," such that the connection may be provided to the first computing device without the first computing device having to re-authenticate with the second computing device. In other words, the second computing device is able to recognize that the first computing device is already authenticated, and thus may bypass steps such as requiring a user of the first computing device to enter a password or other access credential.

In some examples, the second computing device may receive the connection request from the first computing device, and upon recognizing that the connection request is from an authenticated computing device, direct the first computing device to particular content. For example, connection requests from non-authenticated computing devices may be directed to a login website address, while connection requests from authenticated computing devices may be directed to other website addresses that are customized for each authenticated computing device. In more detail, within the context of a payment-related site, a user of a non-authenticated computing device may be directed to a login page, while a user of an authenticated computing device may be directed to a payment-related content pertaining to the particular user.

Similarly, other non-browser applications that access the second computing device from the first computing device may also be included in the same authenticated session, such that a user is not required to perfoini additional authentication using further login credentials. That is, the user of the first computing device may access the second computing device using various applications, and these accesses may be associated by the operating system with the security key or a token derived from the security key. By associating the accesses with the security key/token, the second computing device is able to recognize the first computing device and identify that the first computing device has been authenticated. This extending of the authenticated session between various applications may be referred to as a seamless extension of a same session.

While examples for the above method are described in the context of web-browsers and payment-related websites, the method is not limited to these contexts. For example, the techniques may be implemented on non-payment related websites and by any other computer-based content sources in addition to or instead of websites. For example, merchants may be assigned security keys such that the operating systems of the merchants may authenticate the merchant computing devices with computing devices of payment providers or other transaction partners to perform payments and other transactions.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
   one or more computer-readable memories, with program instructions stored on the one or more computer-readable memories; and
   one or more processors coupled to the one or more computer-readable memories and configured to execute the program instructions to cause the system to perform operations comprising:
   receiving, during a first time period, a security key from a first device, wherein the security key is based on one or more device identifiers associated with the first device, wherein the security key is associated with an operating system of the first device during a boot process of the operating system, and wherein the security key is received independent of requiring a login credential from the first device via a first application on the first device;
   receiving, during a second time period, a request, from the first device, to establish an authenticated session, wherein the request includes the security key;
   in response to determining that the security key received during the second time period matches the security key received during the first time period, establishing an authenticated session with the first device that extends to a plurality of applications of the first device including the first application, wherein the authenticated session enables each of the plurality of applications to communicate with the system through the operating system;
   in response to establishing the authenticated session with the first device, receiving a communication from the operating system of the first device, wherein the communication comprises a session identifier associated with the security key; and
   providing the first device with access to a first content independent of requiring the login credential from the first device via the first application.

2. The system of claim 1, wherein the providing the first device with access to the first content includes providing a read access to a portion of the one or more computer-readable memories.

3. The system of claim 1, wherein the providing the first device access to the first content includes providing a first application with access to the first content, and, at a later time, providing a second application included in the plurality of applications with access to the first content or second content within the established authenticated session.

4. The system of claim 1, wherein the one or more device identifiers includes a serial number corresponding to a hardware component of the first device.

5. The system of claim 1, wherein the security key is generated during a boot process of the first device.

6. The system of claim 1, wherein the first content includes a payment website corresponding to a user of the first device.

7. The system of claim 1, wherein the operations further comprise: in response to establishing the authenticated session with the first device, associating the session identifier with communications received and transmitted to the first device.

8. A method comprising:
   receiving, during a first time period, a security key from a first device, wherein the security key is based on one or more device identifiers associated with the first device, wherein the security key is associated with an operating system of the first device during a boot process of the operating system, and wherein the security key is received independent of requiring a login credential from the first device via a first application on the first device;
   receiving, during a second time period, a request, from the first device, to establish an authenticated session, wherein the request includes the security key;
   in response to determining that the security key received during the second time period matches the security key received during the first time period, establishing an authenticated session with the first device that extends to a plurality of applications of associated with the first device including the first application, wherein the authenticated session enables each of the plurality of applications to communicate within the authenticated session through the operating system;
   in response to establishing the authenticated session with the first device, receiving a communication from the operating system of the first device, wherein the communication comprises a session identifier associated with the security key; and providing the first device with access to a first content independent of requiring the login credential from the first device via the first application.

9. The method of claim 8, wherein the providing the first device access to the first content includes providing the first application with access to the first content, and, at a later time, providing a second application of the plurality of applications with access to the first content or second content within the established authenticated session.

10. The method of claim 8, wherein the one or more device identifiers includes a serial number corresponding to a hardware component of the first device.

11. The method of claim 8, wherein the security key is generated during a boot process of the first device.

12. The method of claim 8, wherein the first content includes a payment website corresponding to a user of the first device.

13. The method of claim 8, further comprising in response to establishing the authenticated session with the first device, associating the session identifier with communications received and transmitted to the first device.

14. A computer program product comprising:
one or more non-transitory machine-readable mediums, wherein program instructions are stored on at least one of the one or more non-transitory machine-readable mediums, and wherein the program instructions, when executed, cause a machine to perform operations comprising:
receiving, during a first time period, a security key from a first device, wherein the security key is based on one or more device identifiers associated with the first device, wherein the security key is associated with an operating system of the first device during a boot process of the operating system, and wherein the security key is received independent of requiring a login credential from the first device via a first application on the first device;
receiving, during a second time period, a request, from the first device, to establish an authenticated session, wherein the request includes the security key;
in response to determining that the security key received during the second time period matches the security key received during the first time period, establishing an authenticated session with the first device that extends to a plurality of applications of the first device including the first application, wherein the authenticated session enables each of the plurality of applications to communicate with the machine through the operating system;
in response to establishing the authenticated session with the first device, receiving a communication from the operating system of the first device, wherein the communication comprises a session identifier associated with the security key; and
providing the first device with access to a first content independent of requiring the login credential from the first device via the first application.

15. The computer program product of claim 14, wherein the providing the first device with access to the first content includes providing a read access to a portion of a second device storing the first content.

16. The computer program product of claim 14, wherein the providing the first device access to the first content includes providing the first application with access to the first content, and, at a later time, providing a second application included in the plurality of applications with access to the first content or second content within the established authenticated session.

17. The computer program product of claim 14, wherein the one or more device identifiers includes a serial number corresponding to a hardware component of the first device.

18. The computer program product of claim 14, wherein the security key is generated during a boot process of the first device.

19. The computer program product of claim 14, wherein the first content includes a payment website corresponding to a user of the first device.

20. The computer program product of claim 14, wherein the operations further comprise: in response to establishing the authenticated session with the first device, associating the session identifier with communications received from and transmitted to the first device.

* * * * *